(12) United States Patent
Tamada et al.

(10) Patent No.: US 11,404,219 B2
(45) Date of Patent: Aug. 2, 2022

(54) ELECTROLYTIC CAPACITOR WITH IMPROVED CONNECTION PART

(71) Applicant: TDK Electronics AG, Munich (DE)

(72) Inventors: Taku Tamada, Hita (JP); Joe Liu, Xiamen (CN); Jonathan Zhao, Xiamen (CN)

(73) Assignee: TDK Electronics AG, Munich (DE)

( * ) Notice: Subject to any disclaimer, the term of this patent is extended or adjusted under 35 U.S.C. 154(b) by 0 days.

(21) Appl. No.: 17/040,347

(22) PCT Filed: Apr. 6, 2018

(86) PCT No.: PCT/EP2018/058894
§ 371 (c)(1),
(2) Date: Sep. 22, 2020

(87) PCT Pub. No.: WO2019/192725
PCT Pub. Date: Oct. 10, 2019

(65) Prior Publication Data
US 2021/0020382 A1 Jan. 21, 2021

(51) Int. Cl.
*H01G 9/008* (2006.01)
*H01G 9/10* (2006.01)
*H01R 4/06* (2006.01)

(52) U.S. Cl.
CPC .......... *H01G 9/008* (2013.01); *H01G 9/10* (2013.01); *H01R 4/06* (2013.01)

(58) Field of Classification Search
CPC ................................ H01G 9/008; H01G 9/10
See application file for complete search history.

(56) References Cited

U.S. PATENT DOCUMENTS

| | | |
|---|---|---|
| 3,091,656 A | 5/1963 | Lamoureaux, Jr. |
| 4,631,631 A | 12/1986 | Hodges et al. |
| 4,811,161 A | 3/1989 | Sasaki et al. |
| 5,177,674 A | 1/1993 | Sugisaki |
| 6,064,563 A | 5/2000 | Yamada et al. |
| 6,587,331 B1 | 7/2003 | Schweikert et al. |
| 7,095,605 B2 | 8/2006 | Suenaga et al. |
| 7,310,219 B2 | 12/2007 | Kosuda et al. |
| 10,741,819 B2 | 8/2020 | Hirose et al. |

(Continued)

FOREIGN PATENT DOCUMENTS

| | | |
|---|---|---|
| CN | 87106316 A | 5/1988 |
| CN | 1205797 A | 1/1999 |

(Continued)

*Primary Examiner* — Eric W Thomas
(74) *Attorney, Agent, or Firm* — Slater Matsil, LLP

(57) ABSTRACT

In an embodiment an electrolytic capacitor includes a covering element configured to close an opening of a can comprising a capacitor element. A connection element comprises a lead tab for applying an electrical signal to the capacitor element and a rivet having a first head to fix the lead tab to the covering element. The connection element includes an upper washer arranged between the first head of the rivet and the lead tab. The lead tab has a first section having a first opening and a second section having a second opening. The lead tab is folded such that the first opening and the second opening of the lead tab are arranged above each other. The rivet is arranged in the first and second openings of the lead tab and in an opening of the upper washer.

20 Claims, 12 Drawing Sheets

(56) References Cited

U.S. PATENT DOCUMENTS

| | | | | |
|---|---|---|---|---|
| 2004/0095709 A1* | 5/2004 | Hata | ........................ | H01G 9/06 |
| | | | | 361/513 |
| 2009/0034161 A1* | 2/2009 | Takeda | ..................... | H01G 9/10 |
| | | | | 361/505 |
| 2012/0264007 A1 | 10/2012 | Sasaki et al. | | |

FOREIGN PATENT DOCUMENTS

| | | | |
|---|---|---|---|
| CN | 1717758 | A | 1/2006 |
| CN | 100477036 | C | 4/2009 |
| CN | 204792445 | U | 11/2015 |
| CN | 206040442 | U | 3/2017 |
| CN | 107615520 | A | 1/2018 |
| DE | 2056378 | A1 | 6/1971 |
| GB | 2177553 | A | 1/1987 |
| JP | 10223479 | A * | 8/1998 |
| JP | H1116782 | A | 1/1999 |
| JP | 4895721 | B2 | 3/2008 |
| JP | 2009246287 | A | 10/2009 |
| JP | 2011204725 | A * | 10/2011 |
| JP | 2014072273 | A | 4/2014 |

* cited by examiner

ELECTROLYTIC CAPACITOR WITH IMPROVED CONNECTION PART

This patent application is a national phase filing under section 371 of PCT/EP2018/058894, filed Apr. 6, 2018, of which is incorporated herein by reference in its entirety.

TECHNICAL FIELD

The invention relates to an electrolytic capacitor with an improved connection part used to externally apply a signal to the electrolytic capacitor.

BACKGROUND

An electrolytic capacitor, for example an aluminium electrolytic capacitor, comprises a winding which is impregnated with an electrolyte solution. The impregnated winding is arranged within a can having an opening to insert the winding. The can is closed by a seal material, for example a cover disc. An external terminal to apply a signal to the electrolytic capacitor is fixed at the outer surface of the cover disc. A lead tab is fixed to the inner surface of the cover disc to electrically couple the winding of the electrolytic capacitor with the external terminal.

In most of the manufacturing procedures, the aluminium electrolytic capacitors of Snap-In type and Lug-terminal type which is mainly used in flash are produced based on cold welding (riveting) to connect the lead tab with the cover disc to save manufacturing costs. Washers are provided between the inner surface of the covering element and a head of a rivet to fix the lead tab to the cover disc. In particular, an upper washer is arranged between the head of the rivet and the lead tab. The upper washer is used in the riveting process and it exists for fixing the lead tab and keeping the good electrical contact in the life time of the capacitor. A lower washer arranged between the inner surface of the cover disk and the lead tab is provided to fix the rivet and the external terminal on the cover disc.

During the use of the capacitor, when residual electrolyte solution may come out from the winding, it may enter into the gaps among the rivet, the upper washer and the lead tab. As a consequence, an oxide membrane/layer will be generated on the surface of the rivet, the upper washer and the lead tab in the gaps by electric current. The oxide membrane/layer causes contact failures at the connection part.

SUMMARY

Embodiments provide an electrolytic capacitor with an improved connection part to prevent the development of an oxide layer on the surface of components of the connection part to avoid contact failures at the connection part.

According to an embodiment of an electrolytic capacitor with improved connection part, the electrolytic capacitor comprises a can having an opening, a capacitor element being housed by the can, and a covering element being arranged to close the opening of the can. The covering element has an inner surface directed to the inside of the can. The electrolytic capacitor further comprises a connection element comprising a lead tab for applying an electrical signal to the capacitor element. The connection element comprises a rivet having a first head. The rivet penetrates the covering element so that the first head of the rivet protrudes out of the covering element at the inner surface of the covering element. The rivet is configured such that the first head of the rivet fixes the lead tab to the covering element at the inner surface of the covering element. The connection element comprises an upper washer, wherein the upper washer is arranged between the first head of the rivet and the lead tab. The lead tab has a first section having a first opening and a second section having a second opening. The lead tab is folded such that the first opening and the second opening of the lead tab are arranged above each other. The rivet is arranged in the first and the second opening of the lead tab and in an opening of the upper washer.

The embodiment of the electrolytic capacitor allows reducing any gaps among the rivet, the lead tab and the upper washer to prevent immersion of electrolyte/water and to avoid the development of an oxide layer on the surface of the rivet, the lead tab and the upper washer. Therefore, the electrolytic capacitor allows resolving any contact failure between the lead tab and the rivet caused by immersion of electrolyte/water to gaps and oxidation of connection materials.

BRIEF DESCRIPTION OF THE DRAWINGS

Further embodiments of the electrolytic capacitor and the method to manufacture the electrolytic capacitor are specified in the claims.

DETAILED DESCRIPTION OF ILLUSTRATIVE EMBODIMENTS

Figure 1A:
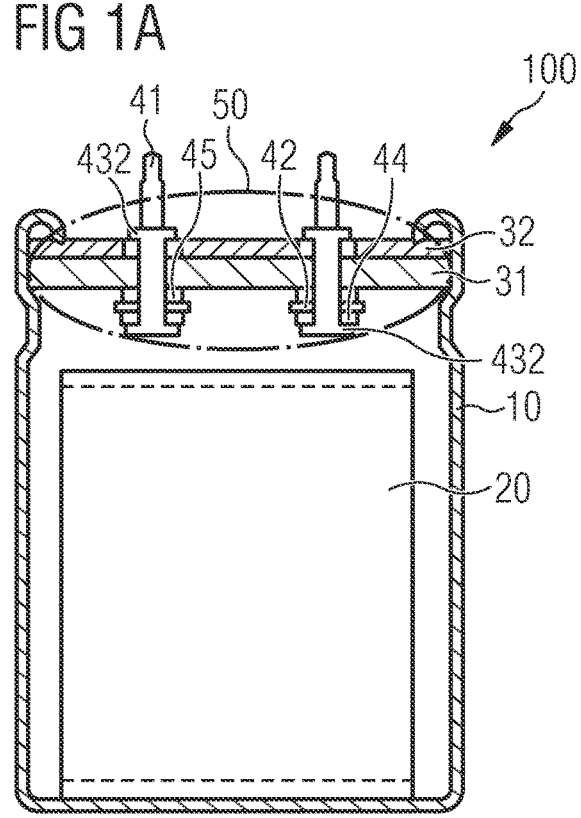
FIG. 1A shows a sectional view of an embodiment of an electrolytic capacitor from a first side.
Figure 1B:
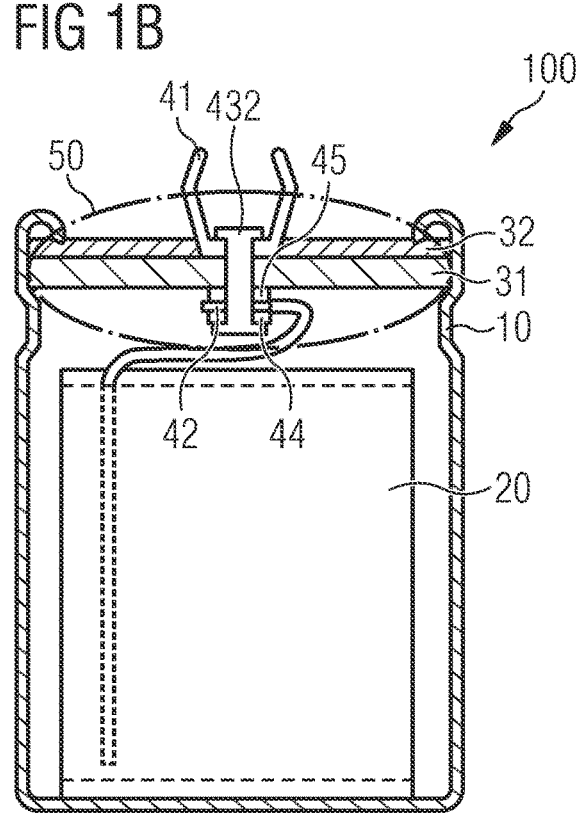
FIG. 1B shows a sectional view of an embodiment of an electrolytic capacitor from a second side.

FIG. 1A and FIG. 1B respectively show a sectional view of an embodiment of an electrolytic capacitor from different sides. The electrolytic capacitor 100 comprises a can 10, for example an aluminium can, having an opening to insert a capacitor element 20. The capacitor element 20 is housed by the can 10. The capacitor element 20 comprises a winding which is impregnated with an electrolyte solution. A covering element 30 is arranged to close the opening of the can 10. The electrolytic capacitor further comprises a connection element 40 for externally applying an electrical signal to the capacitor element 20.

Figure 2A:
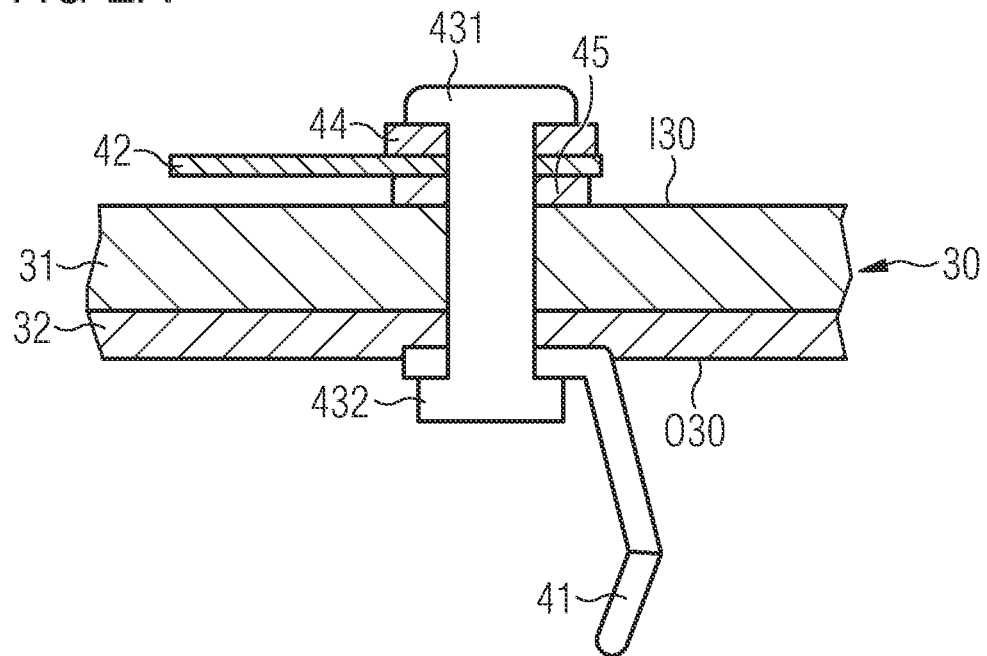
FIG. 2A shows a sectional view of an embodiment of a connection part of an electrolytic capacitor with a straight configuration of a lead tab.
Figure 2B:
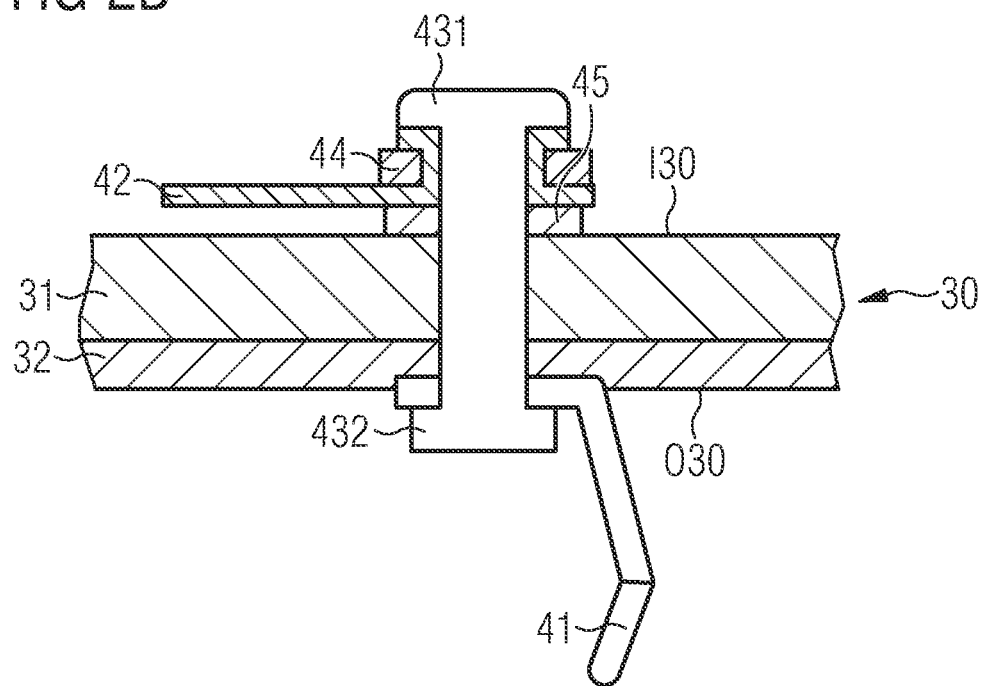
FIG. 2B shows a sectional view of an embodiment of a connection part of an electrolytic capacitor with a folded configuration of a lead tab.

FIGS. 2A and 2B respectively show an enlarged view of two different embodiments of a covering element 30 and a connection element 40. The covering element 30 and the connection element 40 form the connection part 50 of the electrolytic capacitor. The covering element 30 comprises a plate 31, for example made of Bakelite®, and a sealing rubber 32. The sealing rubber 32 is arranged on the plate 31. In the assembled configuration of the electrolytic capacitor, the plate 31 is directed to the inner area of the can 10. The covering element 30 has an inner surface I30 directed to the inside of the can 10 and an opposite outer surface O30 directed to the outside of the can 10.

The connection element 40 comprises an external terminal 41 for applying an electrical signal to the electrolytic capacitor and a lead tab 42 being electrically coupled to the capacitor element 20 and to the external terminal 41. The connection element 40 comprises a rivet 43 having a first head 431 and a second head 432. The rivet 43 penetrates the covering element 30 so that the head 431 of the rivet protrudes out of the covering element 30 at the inner surface I30 of the covering element 30. The head 432 of the rivet 43 protrudes out of the covering element 30 at the outer surface O30 of the covering element 30. The rivet 43 is configured such that the head 431 of the rivet fixes the lead tab 42 to the covering element 30 at the inner surface I30 of the covering element 30, and the head 432 of the rivet fixes the external terminal 41 to the covering element 30 at the surface O30 of covering element 30.

The connection element 40 further comprises an upper washer 44 and a lower washer 45 respectively having an opening to receive the rivet 43. The upper washer 44 is placed between the lead tab 42 and the head 431 of the rivet 43. The upper washer 44 is used in the riveting process and it exists for fixing the lead tab 42 and keeping good electrical contact in the life time of the capacitor. The lower washer 45 is placed between the lead tab 42 and the inner surface I30 of the covering element 30. The lower washer 45 is used to fix the rivet 43 and the external terminal 41 on the covering element 30.

According to the embodiment shown in FIG. 2A, the lead tab 42 is configured in a straight manner being fixed to the covering element 30 by a section of the lead tab that is arranged between the upper washer 44 and the lower washer 45. Although the connection element such as rivet 43, upper washer 44, lower washer 45 and lead tab 42 occupy large volume in the electrolytic capacitor 100, it has been shown that the effective contact area between the lead tab 42 and the rivet 43 that is shown in FIG. 2A by the bold line was too small to keep a good contact that is necessary for long life.

FIG. 2B shows another embodiment of an electrolytic capacitor, wherein the lead tab 42 is configured in a folded manner realizing a connection part with a so called tab-flower. A section of the lead tab that is arranged between the upper washer 44 and the lower washer 45 comprises flexible portions that may be stamped out of the material of a section of the lead tab. The flexible portions are bent such that front parts of the flexible portions protrude out of the opening of the upper washer 44 and are clamped between the upper surface of the upper washer 44 and the head 431 of the rivet 43.

Figure 3A:
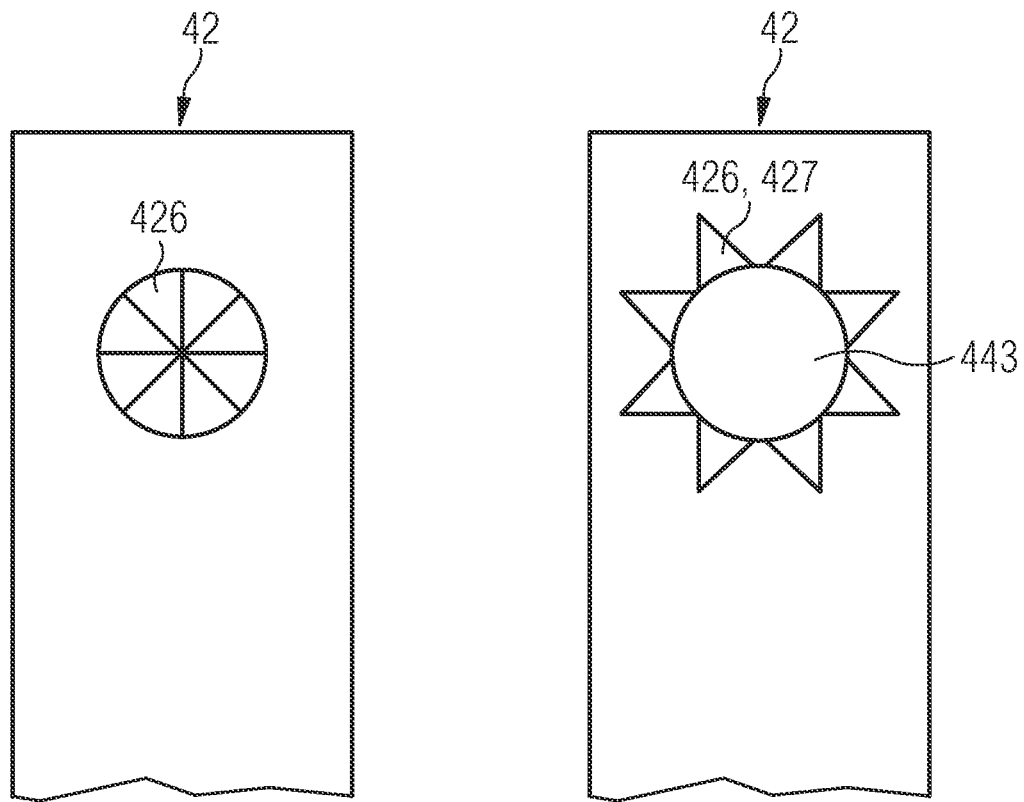
FIG. 3A shows an embodiment of a lead tab being configured as a tab-flower.

FIG. 3A shows on the left side the lead tab 42 comprising flexible portions 426, of which their lateral edges are stamped out of the material of the lead tab. In order to create the tab-flower, the flexible portions are bent to be guided through the opening 443 of the upper washer 44 and folded such that the front parts 427 of the flexible portions 426 form the "tab-flower" that is arranged in a gap between the head 431 of the rivet 43 and the upper washer 44. The tab-flower is shown on the right side of FIG. 3A.

Figure 3B:
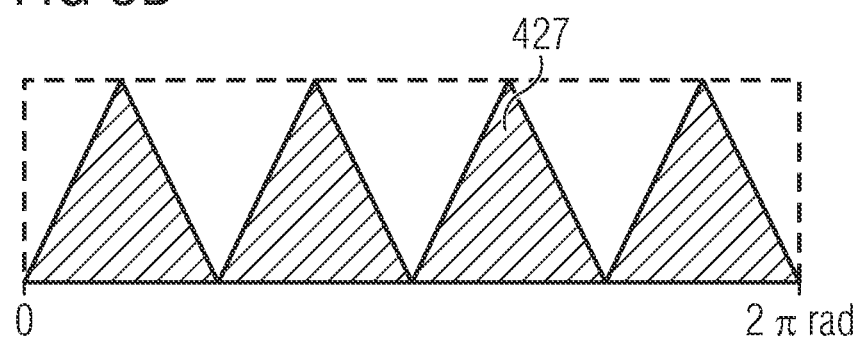
FIG. 3B shows a contact area of a lead tab in a lead tab-flower design.

This "tab-flower riveting" design allows increasing the contact area in comparison to the straight shape of the lead tab of FIG. 2A. The effective contact area provided by the tab-flower-riveting design is illustrated in FIG. 2B by the bold line. FIG. 3B shows the effective contact area of the front parts/peaks of a tab-flower design comprising four flexible portions. Even if the tab-flower-riveting design enables to improve the contact between the lead tab 42 and the upper/lower washer 44, 45 and the rivet 43, the number of the front parts/peaks 427 of a tab-flower and thus the contact area of the individual front parts/peaks 427 is limited. It has been shown that the obtained contact area is not sufficient.

If the contact area will be increased by increasing the number of the flexible portions 426 and thus the number of the front parts/peaks 427, for example from 4 peaks to 8 peaks, the individual area of the front parts/peaks 427 will be decreased and an expansion of the total contact area cannot be obtained. Consequently, contact failures may still not be excluded.

Figure 4A:
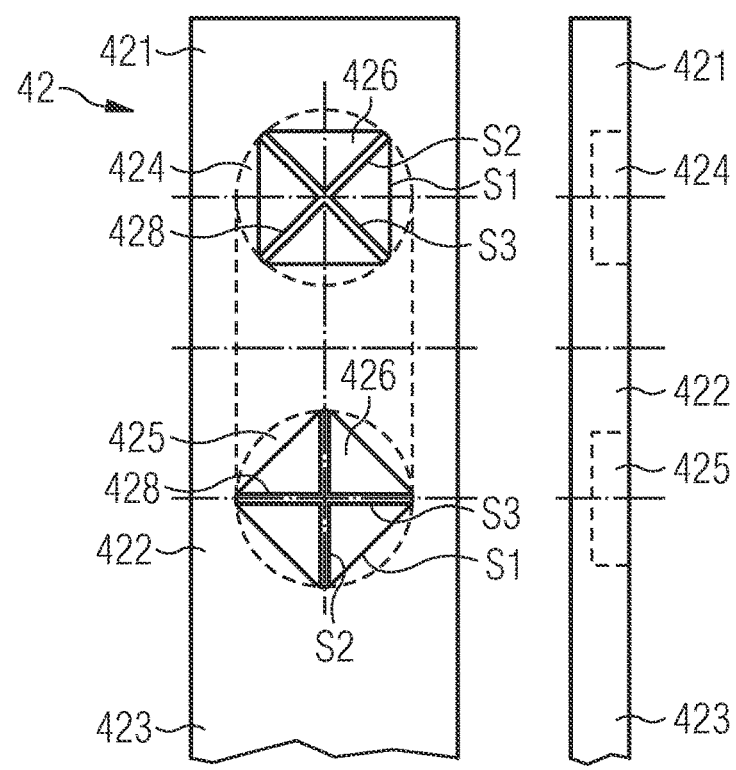
FIG. 4A shows an embodiment of a lead tab of an improved lead tab-flower design.
Figure 4B:
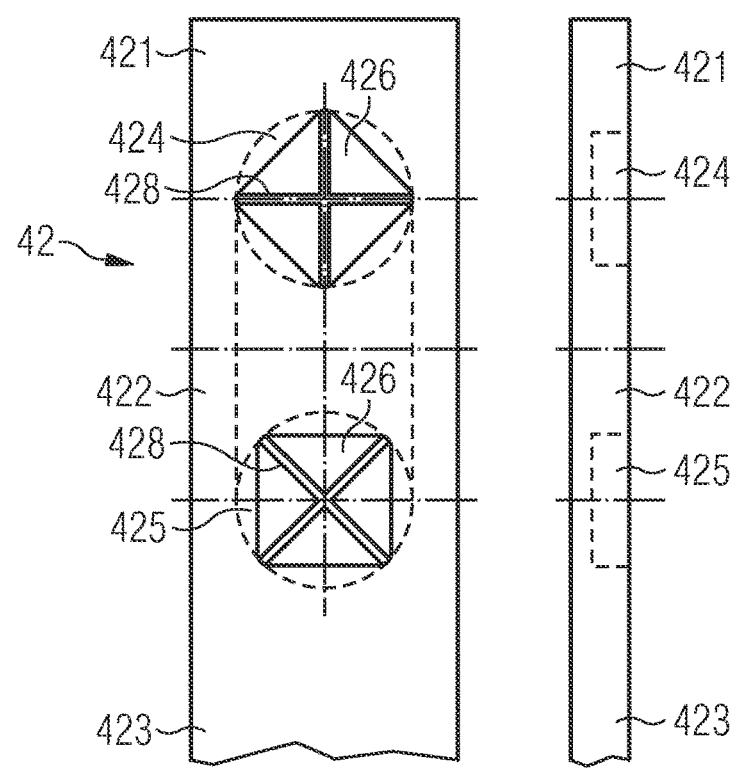
FIG. 4B shows another embodiment of a lead tab of an improved lead tab-flower design.

FIG. 4A and FIG. 4B show different embodiments of a lead tab 42 comprising a first section 421, a second section 422 and a third section 423. The second section 422 of the lead tab 42 is arranged between the first section 421 and the third section 423 of the lead tab 42. The third section 423 of the lead tab is electrically coupled to the capacitor element 20 shown in FIGS. 1A and 1B.

The first section 421 of the lead tab 42 has a first impression mark to form a first opening 424. The second section 422 of the lead tab has a second impression mark to form a second opening 425. The first and the second sections 421, 422 of the lead tab 42 have respective cut-out lines 428 to form respective flexible portions 426 of the first and second section of the lead tab 42.

Each of the plurality of flexible portions 426 has a first side S1 being connected with the remaining material of the respective one of the first and second section 421, 422 of the lead tab, and a second and third side S2, S3 formed by a respective cut-out line 428 in the material of the respective one of the first and second section 421, 422 of the lead tab 42. The cut-out lines 428 of the first section 421 of the lead tab 42 form the first impression mark located at the first section 421 of the lead tab, and the cut-out lines 428 of the second section 422 of the lead tab 42 form the second impression mark located at the second section 422 of the lead tab. In order to form the first opening 424 and the second opening 425, the flexible portions 426 may be bent around their respective first side S1 out of the plane of the first and second section 421, 422 of the lead tab 42. The bending of the flexible portions 426 out of the plane of the first and second section 421, 422 of the lead tab 42 is described later with reference to FIG. 8.

According to the embodiments of the lead tab 42 shown in FIGS. 4A and 4B, the cut-out lines 428 of the flexible portions 426 of the first and second section 421, 422 of the lead tab 42 cross. The cut-out lines are shaped to intersect each other forming a cross, wherein the angle of the cross and the number of the flexible portions stamped out of the material of the first and second section 421, 422 of the lead tab 42 can be arbitrarily chosen.

The cut-out lines 428 of the first and second section 421, 422 of the lead tab 42 may be arranged in the material of the lead tab such that the first and second impression marks and consequently also the first and the second openings 424, 425 have a rectangular shape. The cut-out lines 428 may be provided in the material of the first section 421 and the second section 422 of the lead tab 42 such that the rectangular openings 424 and 425 are skewed to each other. As shown in FIGS. 4A and 4B, the cut-out lines 428 may be formed in the first and second section 421, 422 of the lead tab 42 such that the first and second impression mark and thus the rectangular openings 424 and 425 are turned with reference to each other by 45°.

Figure 5:
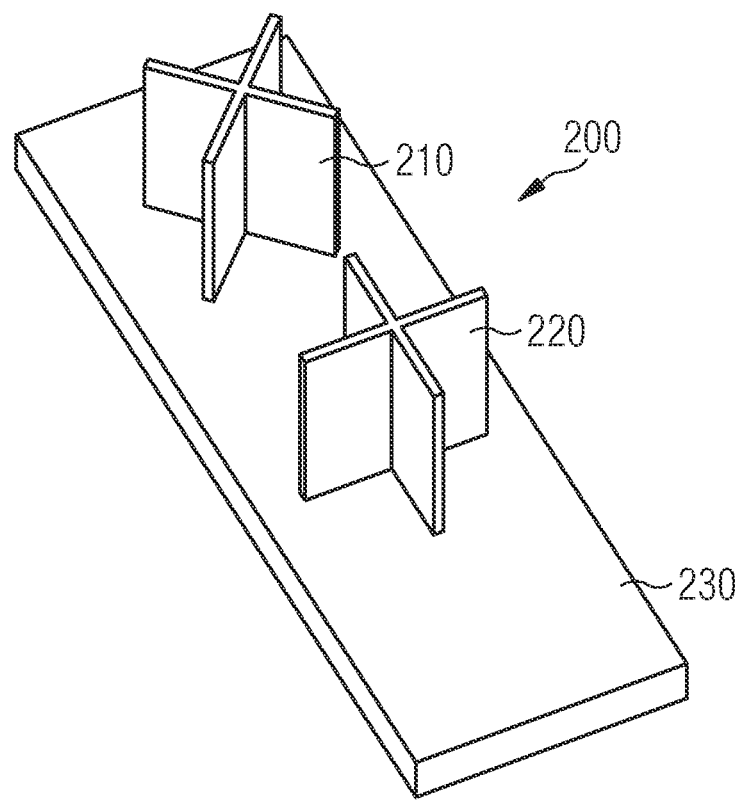
FIG. 5 shows an embodiment of a stamp mold to create impression marks/cut-out lines in the material of a lead tab.

FIG. 5 shows an embodiment of a stamp mold 200 to create impression marks/cut-out lines 428 in the material of the lead tab 42. The tool 200 may comprise a plate 230 of which a first stamping section 210 and a second stamping section 220 protrude. Both of the stamping sections 210, 220 may be configured as thin walls being arranged on the plate 230 with a certain angle, for example an angle of 90°, offset to each other. The first stamping section 210 is configured to create the cut-out lines 428 in the first section 421 of the lead tab, and the second stamping section 220 is configured to create the cut-out lines 428 in the second section 422 of the lead tab.

Figure 6A:
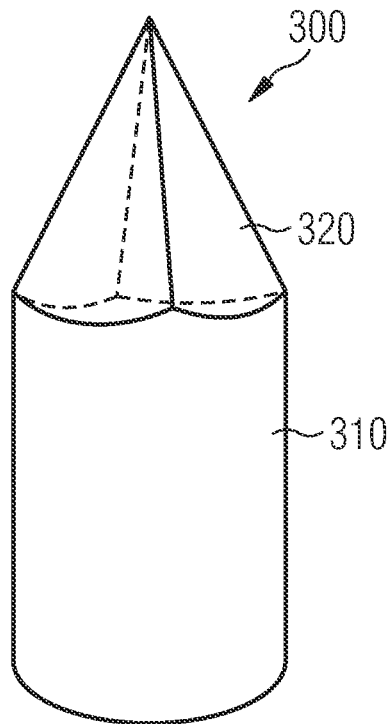
FIG. 6A shows an embodiment of a punching pin to create an opening with flexible portions of a lead tab.
Figure 6B:
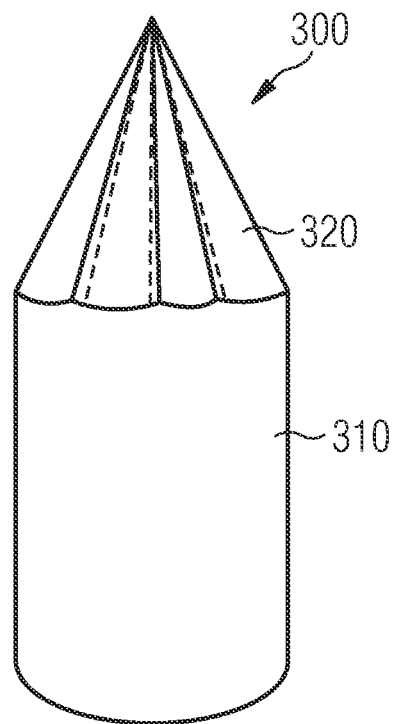
FIG. 6B shows another embodiment of a punching pin to create an opening with flexible portions of a lead tab.

FIGS. 6A and 6B show different embodiments of a punching pin 300 to make the openings along with the cut-out lines 428 in the material of the first section 421 and the second section 422 of the lead tab 42. The punching pin 300 comprises a shaft 310 which may have a circular shape and a tip 320 which may be formed as a quadrangular pyramid, as shown in FIG. 6A, or which may be formed as an octagonal pyramid, as shown in FIG. 6B. The punching pin 300 is used to break through the stamped parts on the lead tab and create the flexible portions 426 of the first and second section 421, 422 of the lead tab 42 to provide the lead tab with the first opening 424 in the first section 421 and with the second opening 425 in the second section 422 of the lead tab.

The embodiment of the punching pin as shown in FIGS. 6A and 6B is used in dependence on the structure of the connection parts. In the case of creating two layers of the openings in the lead tab of the embodiments shown in FIGS. 7 and 8, the punching pin 300 illustrated in FIG. 6B, of which the tip is formed as an octagonal pyramid, can be used after the stamp tool 200 of FIG. 5 is applied. While, in the case of creating each layer of the opening in the lead tab of the embodiments shown in FIGS. 13 and 14, the punching pin 300 according to the configuration shown in FIG. 6A, of which the tip is formed as an rectangular pyramid, can be used in two times.

Figure 7:
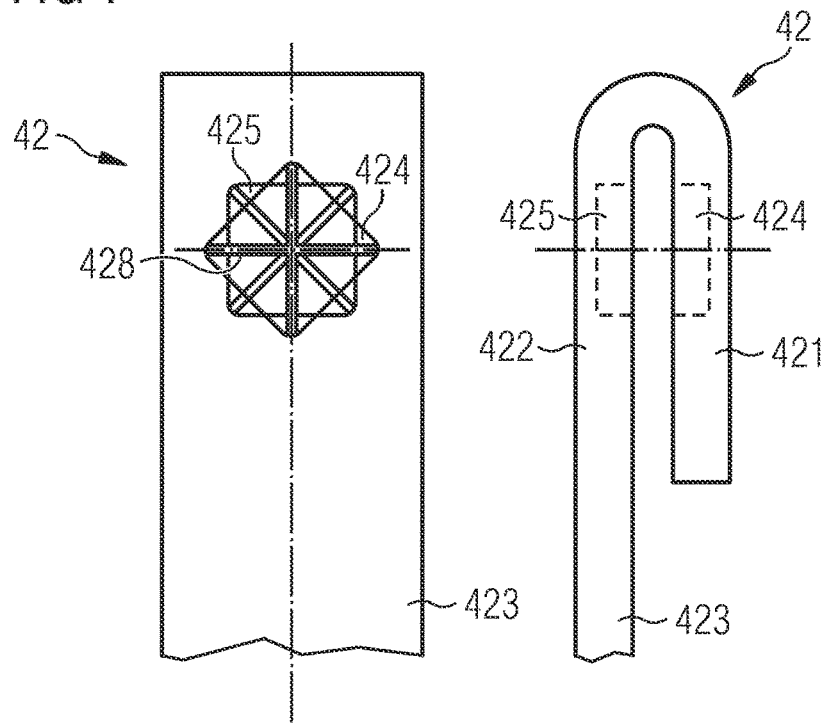
FIG. 7 shows an embodiment of a lead tab in a folded configuration.

The lead tab 42 is folded, as shown in FIG. 7, such that the first section 421 of the lead tab is arranged above the second section 422 of the lead tab. The first impression mark/opening 424 is arranged above the second impression mark/opening 425. The folded configuration shows that the cut-out lines 428 in the material of the first section 421 of the lead tab are offset with respect to the cut-out lines 428 in the material of the second section 422 of the lead tab. The cut-out lines 428 in the material of the first section 421 of the lead tab are not congruent to the cut-out lines 428 in the material of the second section 422 of the lead tab in the folded configuration of the lead tab so that the two impression marks 424, 425 have a different shape.

Figure 8:
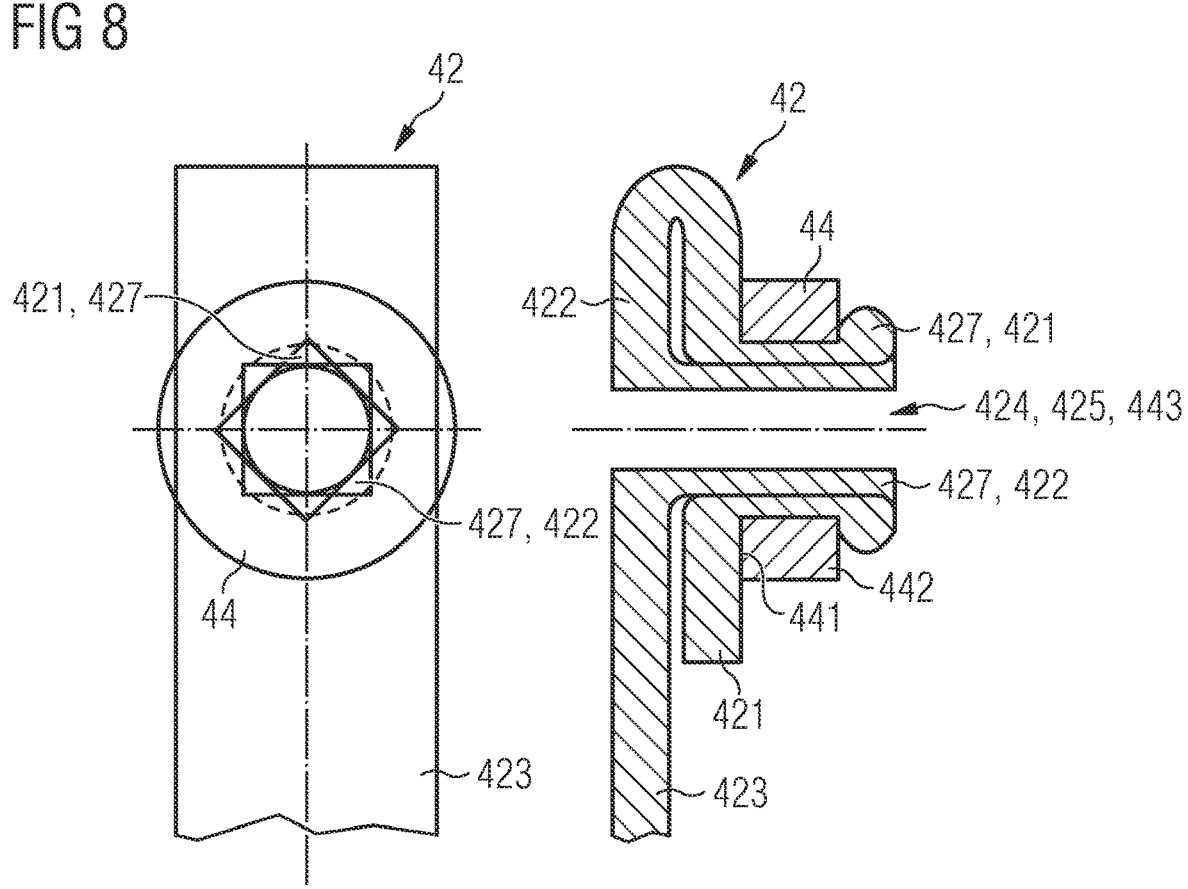
FIG. 8 shows an embodiment of an upper washer and a lead tab in a folded configuration with bent flexible portions.

FIG. 8 shows the forming of the openings 424, 425 in the first and second section 421, 422 of the lead tab 42. The stamp mold 200 shown in FIG. 5 is applied on the surface of the lead tab 42. Consequently, the cut-out lines 428 shown in FIGS. 4A and 4B are obtained. Afterwards, the tip of the tab is folded as shown in FIG. 7. Then, the upper washer 44 is put on the folded lead tab, as shown in FIG. 8, and the upper washer is fixed by the tool of FIG. 6B.

The upper washer 44 is placed on the surface of the first section 421 of the lead tab 42 so that the respective impression mark of the first and second section of the lead tab is arranged below an opening 443 of the upper washer 44. The respective flexible portions 426 of the first and second section 421, 422 of the lead tab 42 are bent out of the respective plane of the first and second section 421, 422 of the lead tab to form the respective first and second opening 424, 425 of the lead tab 42.

The respective flexible portions 426 of the first and second section 421, 422 of the lead tab 42 are bent such that respective front parts 427 of the flexible portions 426 of the first and second section 421, 422 of the lead tab 42 protrude out of the opening 443 of the upper washer 44. The respective front parts 427 of the flexible portions 426 of the first and second section 421, 422 of the lead tab 42 form the tips/peaks of the flexible portions having a triangular shape. The front parts 427 of the flexible portions 426 of the first and second section 421, 422 of the lead tab are folded to be arranged on the upper surface 442 of the upper washer 44.

Figure 9:
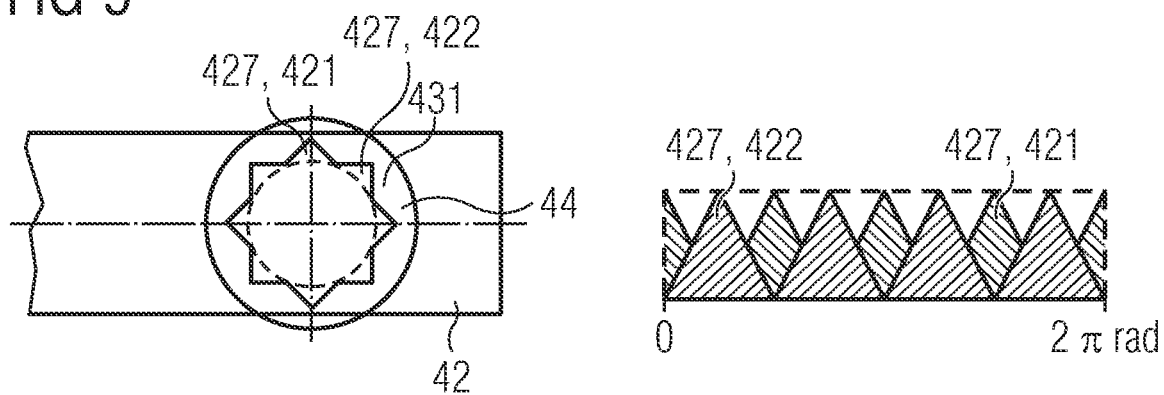
FIG. 9 shows a top view of an embodiment of a connection element of an electrolytic capacitor and an effective contact area of flexible portions of the lead tab of the connection element.

FIG. 9 shows, on the left side, a top view of the lead tab folded as shown in FIG. 8, wherein the respective front parts 427 of the flexible portions of the first and second section 421, 422 of the lead tab 42 are arranged between the upper surface 442 of the upper washer 44 and the lower surface of the head 431 of the rivet 43. FIG. 9 shows on the right side the effective contact area of the front parts 427 of the flexible portions of the first section 421 and the second section 422 of the lead tab 42 between the upper surface 442 of the upper washer 44 and the head 431 of the rivet 43.

As can be seen from FIG. 9, the cut-out lines 428 are formed in the material of the first and second section 421, 422 of the lead tab such that the respective front parts 427 of the flexible portions 426 of the first and second section 421, 422 of the lead tab are offset to each other between the upper surface 442 of the upper washer 44 and the head 431 of the rivet 43. The front parts 427 of the flexible portions 426 of the first section 421 of the lead tab 42 are arranged in the interstices between the front parts 427 of the flexible portions 426 of the second section 422 of the lead tab 42. FIG. 9 shows that the contact area of the lead tab 42 between the upper washer 44 and the rivet 43 is increased in comparison to the contact area of the embodiment of the lead tab shown in FIGS. 3A and 3B.

Figure 10:
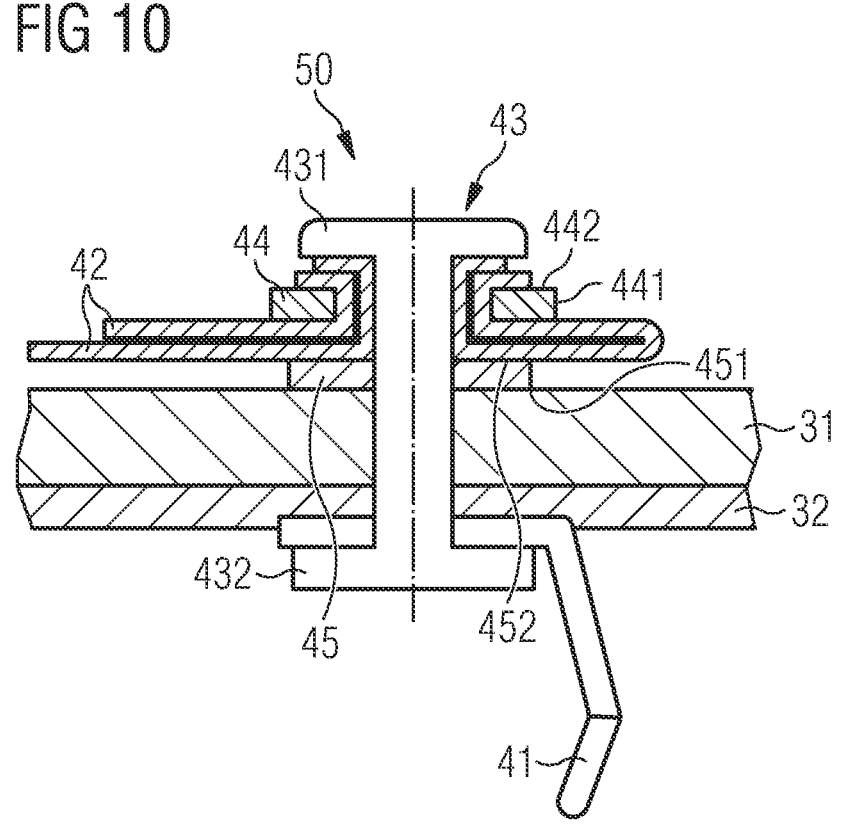
FIG. 10 shows an embodiment of an electrolytic capacitor with an improved connection part.

FIG. 10 shows an embodiment of an electrolytic capacitor 100 having an improved connection part 50. The electrolytic capacitor comprises a can being configured to house a capacitor element, such as shown in FIGS. 1A and 1B. The can has an opening which is covered by a covering element 30 to close the opening of the can. The covering element 30 has an inner surface I30 directed to the inside of the can and an opposite outer surface O30 directed to the outside of the can. The electrolytic capacitor comprises a connection element 40 comprising an external terminal 41 for applying the electrical signal and the lead tab 42 for applying the electrical signal to the capacitor element 20.

The connection element 40 further comprises the rivet 43 having the first head 431 and a second head 432. The rivet 43 penetrates the covering element 30 so that the first head 431 of the rivet protrudes out of the covering element 30 at the inner surface I30 of the covering element. The second head 432 of the rivet protrudes out of the covering element 30 at the outer surface O30 of the covering element 30. The rivet 43 is configured such that the first head 431 of the rivet fixes the lead tab 42 at the inner surface I30 of the covering element 30 to the covering element. The second head 432 of the rivet 43 fixes the external terminal 41 at the outer surface O30 of the covering element 30 to the covering element.

The connection element 40 comprises the upper washer 44 and a lower washer 45. The upper washer 44 is arranged between the first head 431 of the rivet and the lead tab. The lower washer 45 is arranged between the lead tab 42 and the inner surface I30 of the covering element 30. The lower surface 441 of the upper washer 44 is directed to the inner surface I30 of the covering element 30 and an upper surface 442 of the upper washer 44 is directed to the first head 431 of the rivet 43. The lower washer 45 has a lower surface 451 directed to the inner surface I30 of the covering element 30 and an upper surface 452 directed to the lower surface 441 of the upper washer 44. The lower surface 451 of the lower washer 45 is directly placed on the inner surface I30 of the covering element 30.

The lead tab 42 comprises the first section 421 having the first opening 424 and the second section 422 having the second opening 425. The lead tab 42 is folded such that the first opening 424 and the second opening 425 of the lead tab 42 are arranged above each other. The lead tab 42 is folded such that the first section 421 of the lead tab is directly placed onto the second section 422 of the lead tab. The lower surface of the first section 421 of the lead tab touches the upper surface of the second section 422 of the lead tab. The first and second section 421, 422 of the lead tab 42 are arranged between the upper surface 452 of the lower washer 45 and the lower surface 441 of the upper washer 44. The upper surface of the first section 421 of the lead tab touches the lower and upper surfaces 441, 442 of the upper washer 44. The rivet 43 is arranged in the first and the second opening 424, 425 of the lead tab 42 and in the opening 443 of the upper washer 44.

The first opening 424 and the second opening 425 of the lead tab are formed by bending the flexible portions 426 of the first and second section 421, 422 of the lead tab 42 through the opening 443 of the upper washer 44 such that the front parts 427 of the flexible portions 426 of at least one of the first and second section 421, 422 of the lead tab 42 are arranged between the upper surface 441 of the upper washer 44 and the first head 431 of the rivet 43. According to the embodiment shown in FIG. 10, both front parts 427 of the flexible portions 426 of the first and second section 421, 422 of the lead tab 42 are arranged between the upper surface 441 of the upper washer 44 and the first head 431 of the rivet 43.

Figure 11:
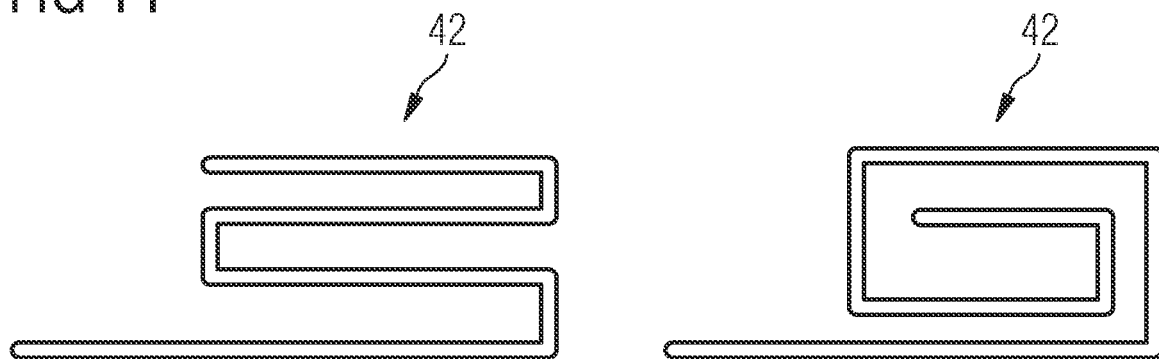
FIG. 11 shows lead tabs in different folded configurations.

In addition to the folding of the lead tab as shown in FIGS. 7 and 8, there is a plurality of other possibilities for folding the lead tab 42. FIG. 11 shows two other examples of folding the lead tab for providing the improved connection part having an enlarged contact area. Tab folding is allowed as much as possible to create the tab-flower.

Figure 12:
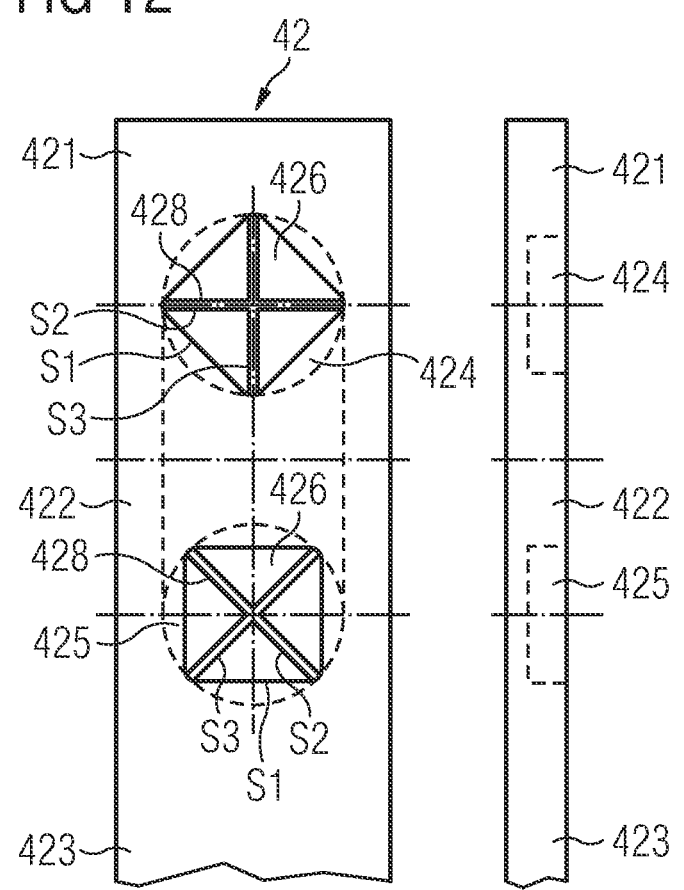
FIG. 12 shows an embodiment of a lead tab of an improved lead tab-flower design.

FIGS. 12 to 18 show another embodiment of an electrolytic capacitor 100 having an improved connection part 50 with an enlarged contact area between the lead tab 42 and the upper/lower washer and the rivet. As shown in FIG. 12, the lead tab 42 is provided with a first section 421 having a first opening 424 and a second section 422 having a second opening 425. The lead tab 42 comprises the third section 423 electrically coupled to the capacitor element 20 shown in FIG. 1A or 1B. The second section 422 of the lead tab 42 is arranged between the first section 421 and the third section 423 of the lead tab.

The first and second section 421, 422 may be embodied in a similar manner as shown in FIG. 4B. The first and second section 421, 422 of the lead tab 42 may be provided with respective cut-out lines 428 to form respective flexible portions 426 of the first and second section of the lead tab 42 for forming the first opening 424 and the second opening 425. The cut-out lines of each of the first and second section of the lead tab may cross. The cut-out lines 428 in the material of the first section 421 of the lead tab may be shifted with reference to the cut-out lines 428 of the second section 422 of the lead tab.

Each of the plurality of flexible portions 426 may have a first side S1 at which the respective flexible portion 426 is connected with the material of the first and second section 421, 422 of the lead tab, and a second and third side S2, S3 formed by the respective cut-out line 428 in the material of the first and second section of the lead tab. The first and second opening 424, 425 are formed by bending the flexible portions 426 of the first and second section of the lead tab around the respective first side S1 and out of the respective plane of the first and second section 421, 422 of the lead tab.

Figure 13:
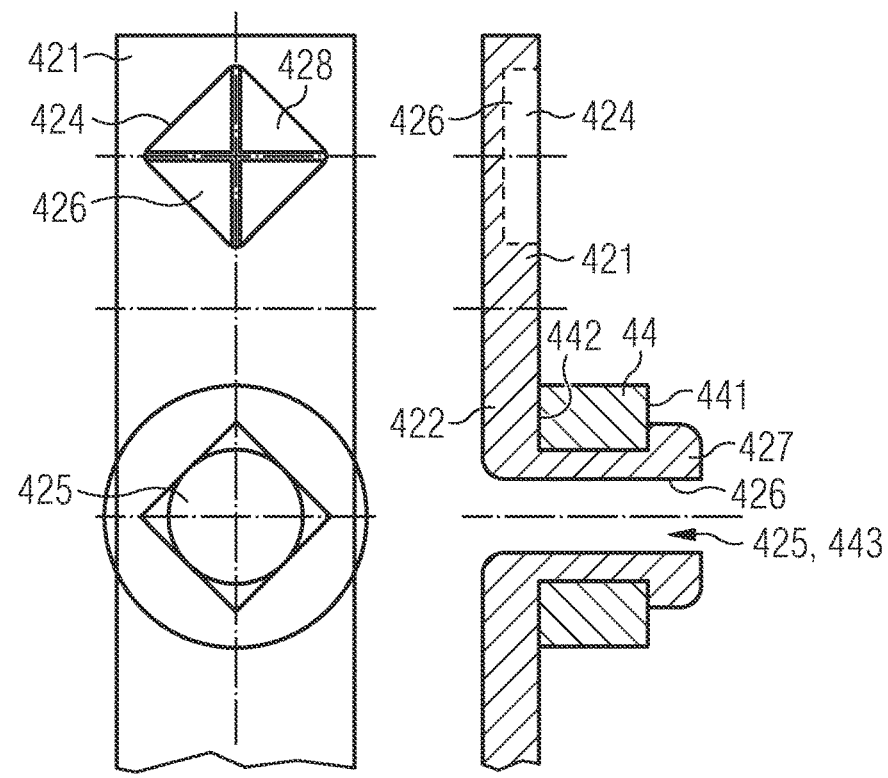
FIG. 13 shows an embodiment of a lead tab with an upper washer and bent flexible portions.
Figure 14:
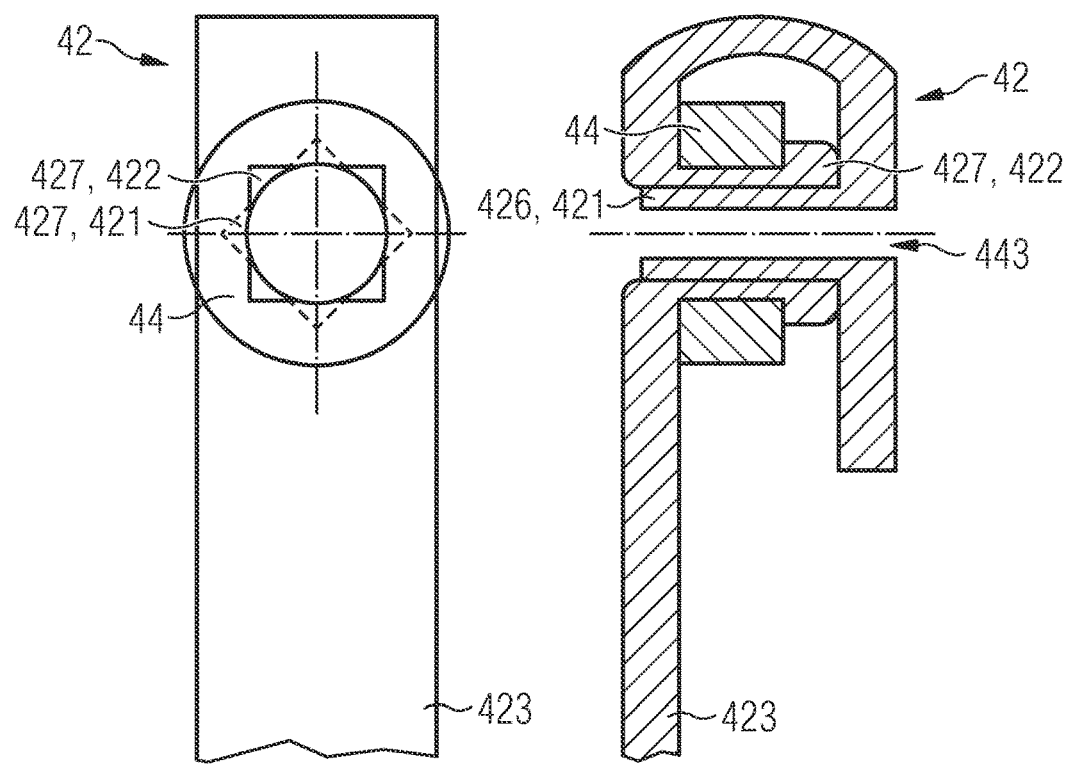
FIG. 14 shows an embodiment of an upper washer and a lead tab in a folded configuration.

FIGS. 13 and 14 show subsequent manufacturing steps to manufacture an embodiment of the electrolytic capacitor having a connection part 50 as shown later on in FIG. 15. The upper washer 44 is put on the second section 422 of the lead tab, as shown in FIG. 13, and the upper washer is 44 is fixed by the tool 300 of FIG. 6A. There, the tab-flowers are stamped out from the second section 422 of the lead tab by the tool 300 and the generated tab-flowers fix the upper washer 44. The tool 300 may penetrate the tab from the left hand side to the right hand side. Afterwards, the first section 421 of the tab 42 is folded back on the upper washer 44 and the washer is fixed again with the tool 300 of FIG. 6A. With reference to FIG. 14, the tool may penetrate the tab from the right hand side to the left hand side.

In the manufacturing step shown in FIG. 13, the upper washer 44 is placed so that the opening 443 of the upper washer is placed above the impression mark of the second section 422 of the lead tab. The flexible portions 426 of the second section 422 of the lead tab are bent such that the front parts 427 of the flexible portions 426 of the second section 422 of the lead tab protrude out of the opening 443 of the upper washer 44. The opening 425 in the second section 422 of the lead tab is thus formed by bending the flexible portions 426 of the second section 422 of the lead tab out of the plane of the second section 422 of the lead tab and through the opening 443 of the upper washer 44. The flexible portions 426 of the second section 422 of the lead tab are further formed such that the front parts 427 of the flexible portions 426 of the second section 422 of the lead tab are placed on the surface 441 of the upper washer 44.

In a next processing step shown in FIG. 14, the lead tab is folded such that the first section 421 of the lead tab is folded back so that the impression mark forming the first opening 424 is placed above the opening 425 of the second section 422 of the lead tab and above the opening 443 of the upper washer 44. In order to form the opening 424 in the first section 421 of the lead tab, the flexible portions 426 of the first section 421 of the lead tab are bent through the opening 443 of the upper washer 44 so that the front parts 427 of the flexible portions 426 of the first section 421 of the lead tab protrude out of the opening 443 of the upper washer 44 at the opposite side.

In order to manufacture the connection part of the electrolytic capacitor, the rivet 43 is inserted in the opening 443 of the upper washer 44 and the rivet shaft is crushed to connect the lead tab 42 with the cover disk. FIG. 15 shows the connection part 50 of the electrolytic capacitor being manufactured as shown in FIGS. 12 to 14 after the rivet 43 is inserted in the opening 443 of the upper washer 44 and the rivet is crushed for forming heads 431 and 432.

According to a second method, instead of placing the upper washer 44 on the region of the impression mark forming the second opening 425 in the second section 422 of the lead tab, the upper washer 44 may alternatively be placed on the region of the impression mark forming the first opening 424 of the first section 421 of the lead tab. In a next step, the flexible portions 426 of the first section 421 of the lead tab are bent through the opening 443 of the upper washer 44 for forming the first opening 424. In a subsequent step, the front parts 427 of the flexible portions 426 of the first section 421 are bent such that they are arranged on the surface 441 of the upper washer 44.

In a next processing step, the first section 421 at which the upper washer 44 is fixed by the bended flexible portions 426 of the first section 421 of the lead tab is folded back so that the opening 424 is placed above the impression mark of the second section 422 of the lead tab. The opening 421 is congruently placed above the impression mark 425 of the second section 422 of the lead tab.

In a subsequent step, the flexible portions 426 of the second section 422 of the lead tab are bent through the opening 443 of the upper washer 44 and protrude out of the opening 443 of the upper washer 44. The front parts 427 of the flexible portions 426 of the second section 422 are folded to be placed on the first section of the lead tab. In order to fix the lead tab 42 to the connection element 30 the rivet 43 is inserted through the opening 443 of the upper washer and the rivet 43 is crushed for forming the first and second head 431, 432 of the rivet. The embodiment of the connection part 50 of the electrolytic capacitor 100 manufactured as described according to the second method of manufacturing is shown in FIG. 16.

Figure 15:
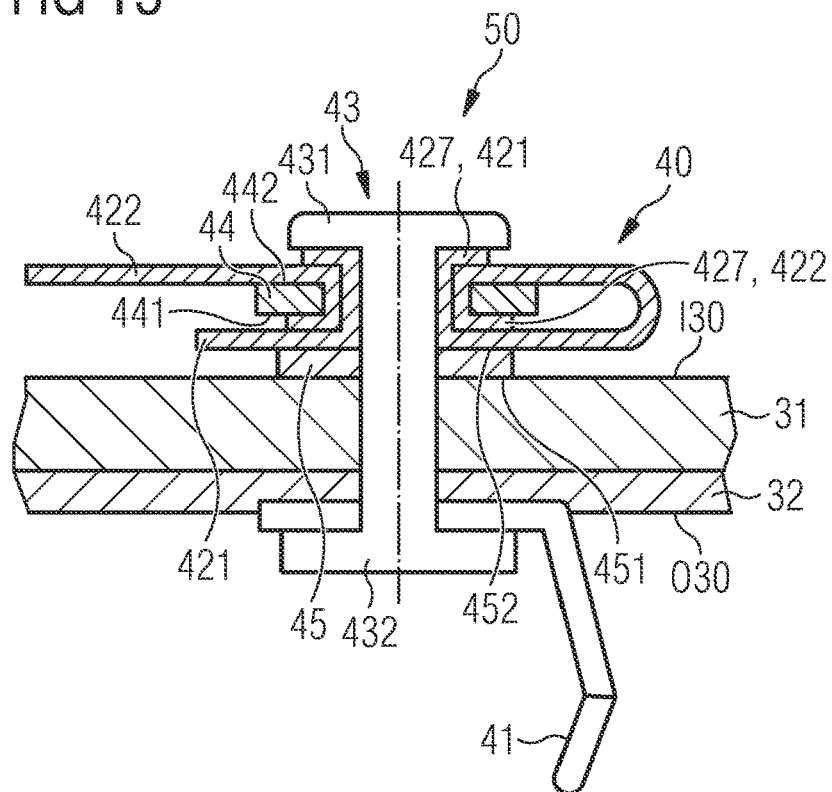
FIG. 15 shows an embodiment of an electrolytic capacitor with an improved connection part.
Figure 16:
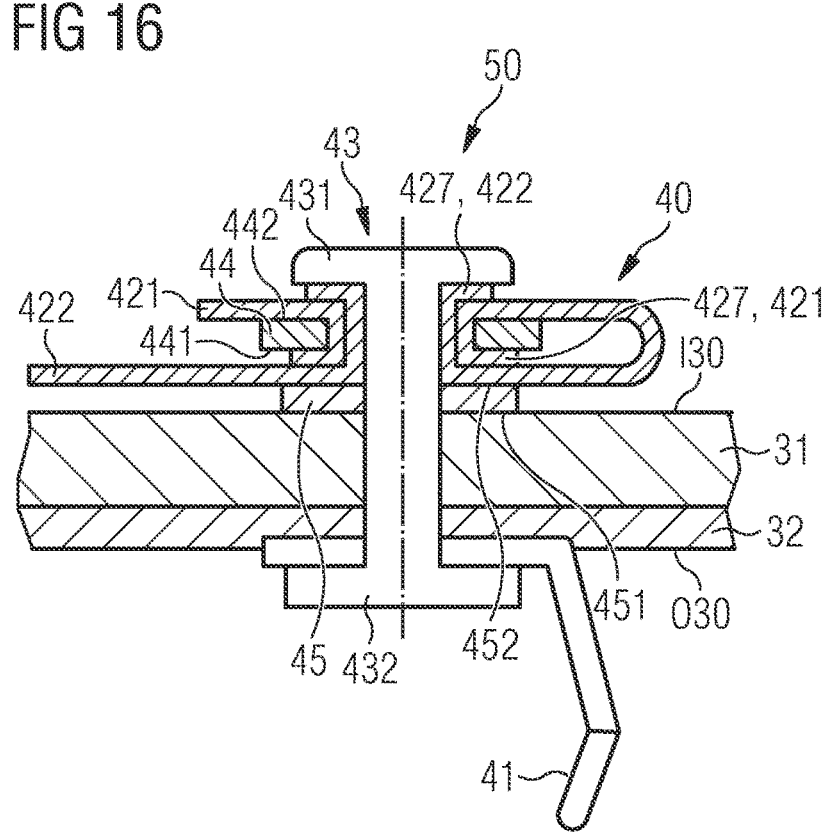
FIG. 16 shows another embodiment of an electrolytic capacitor with an improved connection part.

According to the embodiment of the electrolytic capacitor having connection parts 50 as shown in FIGS. 15 and 16, the connection element 40 comprises the external terminal 41 for applying the electrical signal to the electrolytic capacitor and the lead tab 42 for applying the electrical signal to the capacitor element 20. The connection element 40 comprises the rivet 43 having the first and second head 431, 432. The rivet 43 penetrates the covering element 40 so that the first head 431 of the rivet protrudes out of the covering element 30 at the inner surface I30 of the covering element 30. The second head 432 of the rivet 43 protrudes out of the covering element 30 at the outer surface O30 of the covering element 30. The rivet 43 is configured such that the first head 431 of the rivet fixes the lead tab 42 to the covering element 30 at the inner surface I30 of the covering element 30 and the second head 432 of the rivet fixes the external terminal 41 to the covering element 30 at the outer surface O30 of the covering element 30.

The connection element 40 comprises the upper washer 44 having the opening/hole 443 and the lower washer 45 having the opening/hole 453. The upper washer 44 is arranged between the first head 431 of the rivet and the lead tab 42. The lower washer 45 is arranged between the lead tab 42 and the inner surface I30 of the covering element 30. The lead tab 42 is folded such that the first opening/hole 424 and the second opening/hole 425 of the lead tab are arranged above each other. As shown in FIGS. 15 and 16, both of the first and second opening 424 and 425 are congruently arranged above each other. The rivet 43 is arranged in the first and second opening 424, 425 of the lead tab 42 and in the opening 443 of the upper washer 44. The rivet is further arranged in the opening/hole of the lower washer 45 and in a hole of the covering element 30. The opening 424 and the opening 425 are formed by bending the flexible portions 426 of the first and second section 421, 422 of the lead tab 42 through the opening 443 of the upper washer 44 such that the front parts 427 of the flexible portions 426 of at least one of the first and second section 421, 422 of the lead tab 42 are arranged between the upper surface 442 of the upper washer and the first head 431 of the rivet 43.

According to the embodiment of the electrolytic capacitor having a connection part 50 as shown in FIG. 15, the second section 422 of the lead tab 42 is directly placed on the upper surface 442 of the upper washer 44. The lead tab 42 is folded such that the first section 421 of the lead tab 42 is directly placed onto the upper surface 452 of the lower washer 45.

According to the embodiment shown in FIG. 15, the first and the second section 421, 422 of the lead tab 42 have respective cut-out lines 428 to form the respective flexible portions 426 of the first and second section of the lead tab 42. The flexible portions 426 of the second section 422 of the lead tab 42 are bent such that the front parts 427 of the flexible portions 426 of the second section 422 of the lead tab protrude out of the opening 443 of the upper washer 44 and are folded such that the front parts 427 of the flexible portions 426 of the second section 422 of the lead tab are placed on the lower surface 441 of the upper washer 44.

According to the embodiment shown in FIG. 15, the flexible portions 426 of the first section 421 of the lead tab 42 are bent such that the front parts 427 of the flexible portions 426 of the first section 421 of the lead tab 42 protrude out of the opening 443 of the upper washer 44 and are folded such that the front parts 427 of the flexible portions 426 of the first section 421 of the lead tab 42 are placed between the second section 422 of the lead tab and the first head 431 of the rivet 43.

According to the embodiment of the connection part 50 of the electrolytic capacitor shown in FIG. 16, the first section 421 of the lead tab 42 is directly placed on the upper surface 442 of the upper washer 44. The lead tab 42 is folded such that the second section 422 of the lead tab 42 is directly placed onto the upper surface 452 of the lower washer 45. The flexible portions 426 of the first section 421 of the lead tab 42 are bent such that the front parts 427 of the flexible portions 426 of the first section 421 of the lead tab protrude out of the opening 443 of the upper washer 44 and are folded such that the front parts 427 of the flexible portions 426 of the first section 421 of the lead tab are placed on the lower surface 441 of the upper washer 44.

According to the embodiment of the connection part 50 of the electrolytic capacitor shown in FIG. 16, the flexible portions 426 of the second section 422 of the lead tab 42 are bent such that the front parts 427 of the flexible portions 426 of the second section 422 of the lead tab 42 protrude out of the opening 443 of the upper washer 44 and are folded such that the front parts 427 of the flexible portions 426 of the second section 422 of the lead tab 42 are placed between the first section 421 of the lead tab and the first head 431 of the rivet 43.

Figure 17:
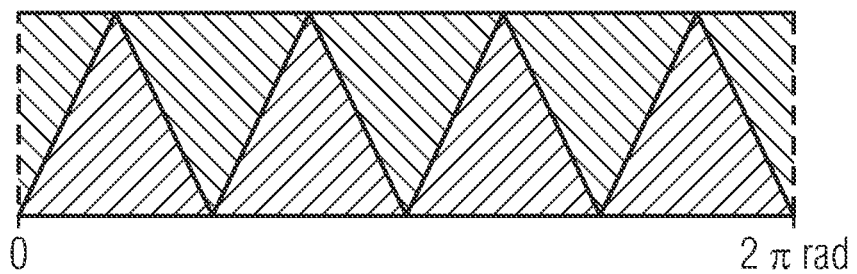
FIG. 17 shows a contact area of a lead tab of an improved embodiment of the electrolytic capacitor.

FIG. 17 shows the contact area of the lead tab 42 between the first head 431 of the rivet and the upper washer 44 and the contact area of the lead tab 42 between the upper washer 44 and the lower washer 45. The contact area is increased in comparison to the contact area shown in FIG. 3B of a connection part comprising an embodiment of a lead tab as shown in FIG. 3A. Due to the enlarged contact area, the embodiments of the connection part shown in FIGS. 15 and 16 allow good contact for a long life of the connection part.

Figure 18:
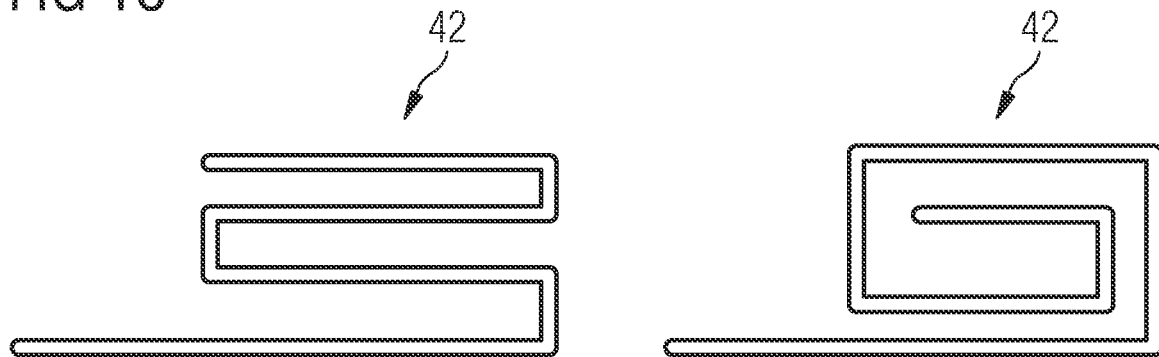
FIG. 18 shows embodiments of a lead tab in different folded configurations.

In addition to the folding of the lead tab as shown in FIGS. 13 to 16, there is a plurality of other possibilities for folding the lead tab 42. FIG. 18 shows two other examples of folding the lead tab 42 for providing the improved connection part having an enlarged contact area. Tab folding is allowed as much as possible to create the tab-flower.

The invention claimed is:

1. An electrolytic capacitor comprising:
   a can having an opening;
   a capacitor element housed by the can;
   a covering element configured to close the opening of the can, wherein the covering element has an inner surface directed to an inside of the can; and
   a connection element comprising a lead tab configured to apply an electrical signal to the capacitor element, wherein the connection element comprises a rivet having a first head, wherein the rivet penetrates the covering element so that the first head of the rivet protrudes out of the covering element at the inner surface of the covering element, wherein the rivet is configured such that the first head of the rivet fixes the lead tab to the covering element at the inner surface of the covering element,
   wherein the connection element comprises an upper washer, wherein the upper washer is arranged between the first head of the rivet and the lead tab,
   wherein the lead tab has a first section having a first opening and a second section having a second opening,
   wherein the lead tab is folded such that the first opening and the second opening of the lead tab are arranged above each other,
   wherein the rivet is arranged in the first and the second openings of the lead tab and in an opening of the upper washer,
   wherein the connection element comprises a lower washer arranged between the lead tab and the inner surface of the covering element,
   wherein the upper washer has a lower surface directed to the inner surface of the covering element and an upper surface directed to the first head of the rivet,
   wherein the lower washer has a lower surface directed to the inner surface of the covering element and an upper surface directed to the lower surface of the upper washer,
   wherein the second section of the lead tab is directly placed on the upper surface of the upper washer, and
   wherein the lead tab is folded such that the first section of the lead tab is directly placed onto the upper surface of the lower washer.

2. The electrolytic capacitor as claimed in claim 1, wherein the lead tab comprises a third section electrically coupled to the capacitor element, and
   wherein the second section of the lead tab is arranged between the first section and the third section of the lead tab.

3. The electrolytic capacitor as claimed in claim 1, wherein the first and second sections of the lead tab have respective cut-out lines to form respective flexible portions of the first and second sections of the lead tab, and
   wherein the respective flexible portions of the first and second sections of the lead tab are bent out of a respective plane of the first and second sections of the lead tab to form the respective first and second openings of the lead tab in a material of the first and second sections of the lead tab.

4. The electrolytic capacitor as claimed in claim 3, wherein each of the plurality of the flexible portions has a triangular shape having a first side at which the respective flexible portion is bent and a second and third side formed by a respective one of the cut-out lines in the material of the first and second sections of the lead tab.

5. The electrolytic capacitor as claimed in claim 4, wherein the cut-out lines in the material of the first section of the lead tab are offset with respect to the cut-out lines in the material of the second section of the lead tab.

6. The electrolytic capacitor as claimed in claim 3, wherein the respective flexible portions of the first and second sections of the lead tab are bent such that respective front parts of the respective flexible portions of the first and second sections of the lead tab protrude out of the opening of the upper washer.

7. The electrolytic capacitor as claimed in claim 6, wherein the first and second sections of the lead tab are arranged between the upper surface of the lower washer and the lower surface of the upper washer, and
   wherein the respective front parts of the flexible portions of the first and second sections of the lead tab are folded such that the respective front parts of the flexible portions of the first and second sections of the lead tab are placed between the upper surface of the upper washer and the first head of the rivet.

8. The electrolytic capacitor as claimed in claim 1, wherein the lead tab is folded such that the first section of the lead tab is directly placed onto the second section of the lead tab.

9. The electrolytic capacitor as claimed in claim 1, wherein the first and second sections of the lead tab has respective cut-out lines to form respective flexible portions of the first and second sections of the lead tab, wherein the flexible portions of the second section of the lead tab are bent such that front parts of the flexible portions of the second section of the lead tab protrude out of the opening of the upper washer and are folded such that the front parts of the flexible portions of the second section of the lead tab are placed on the lower surface of the upper washer.

10. The electrolytic capacitor as claimed in claim 9, wherein the flexible portions of the first section of the lead tab are bent such that the front parts of the flexible portions of the first section of the lead tab protrude out of the opening of the upper washer and are folded such that the front parts of the flexible portions of the first section of the lead tab are placed between the second section of the lead tab and the first head of the rivet.

11. The electrolytic capacitor as claimed in claim 1,
wherein the first section of the lead tab is directly placed on the upper surface of the upper washer, and
wherein the lead tab is folded such that the second section of the lead tab is directly placed onto the upper surface of the lower washer.

12. The electrolytic capacitor as claimed in claim 11,
wherein the first and second sections of the lead tab has respective cut-out lines to form respective flexible portions of the first and second sections of the lead tab, and
wherein the flexible portions of the first section of the lead tab are bent such that front parts of the flexible portions of the first section of the lead tab protrude out of the opening of the upper washer and are folded such that the front parts of the flexible portions of the first section of the lead tab are placed on the lower surface of the upper washer.

13. The electrolytic capacitor as claimed in claim 11, wherein flexible portions of the second section of the lead tab are bent such that front parts of the flexible portions of the second section of the lead tab protrude out of the opening of the upper washer and are folded such that the front parts of the flexible portions of the second section of the lead tab are placed between the first section of the lead tab and the first head of the rivet.

14. An electrolytic capacitor comprising:
a can having an opening;
a capacitor element housed by the can;
a covering element configured to close the opening of the can, wherein the covering element has an inner surface directed to an inside of the can; and
a connection element comprising a lead tab configured to apply an electrical signal to the capacitor element, wherein the connection element comprises a rivet having a first head, wherein the rivet penetrates the covering element so that the first head of the rivet protrudes out of the covering element at the inner surface of the covering element, wherein the rivet is configured such that the first head of the rivet fixes the lead tab to the covering element at the inner surface of the covering element,
wherein the connection element comprises an upper washer, wherein the upper washer is arranged between the first head of the rivet and the lead tab,
wherein the lead tab has a first section having a first opening and a second section having a second opening,
wherein the lead tab is folded such that the first opening and the second opening of the lead tab are arranged above each other,
wherein the rivet is arranged in the first and the second openings of the lead tab and in an opening of the upper washer,
wherein the first and second sections of the lead tab have respective cut-out lines to form respective flexible portions of the first and second sections of the lead tab, and
wherein the respective flexible portions of the first and second sections of the lead tab are bent out of a respective plane of the first and second sections of the lead tab to form the respective first and second openings of the lead tab in a material of the first and second sections of the lead tab.

15. The electrolytic capacitor as claimed in claim 14, wherein each of the plurality of the flexible portions has a triangular shape having a first side at which the respective flexible portion is bent and a second and third side formed by a respective one of the cut-out lines in the material of the first and second sections of the lead tab.

16. The electrolytic capacitor as claimed in claim 15, wherein the cut-out lines in the material of the first section of the lead tab are offset with respect to the cut-out lines in the material of the second section of the lead tab.

17. The electrolytic capacitor as claimed in claim 14, wherein the respective flexible portions of the first and second sections of the lead tab are bent such that respective front parts of the respective flexible portions of the first and second sections of the lead tab protrude out of the opening of the upper washer.

18. An electrolytic capacitor comprising:
a can having an opening;
a capacitor element housed by the can;
a covering element configured to close the opening of the can, wherein the covering element has an inner surface directed to an inside of the can; and
a connection element comprising a lead tab configured to apply an electrical signal to the capacitor element, wherein the connection element comprises a rivet having a first head, wherein the rivet penetrates the covering element so that the first head of the rivet protrudes out of the covering element at the inner surface of the covering element, wherein the rivet is configured such that the first head of the rivet fixes the lead tab to the covering element at the inner surface of the covering element,
wherein the connection element comprises an upper washer, wherein the upper washer is arranged between the first head of the rivet and the lead tab,
wherein the lead tab has a first section having a first opening and a second section having a second opening,
wherein the lead tab is folded such that the first opening and the second opening of the lead tab are arranged above each other,
wherein the rivet is arranged in the first and the second openings of the lead tab and in an opening of the upper washer,
wherein the first section of the lead tab is directly placed on an upper surface of the upper washer, and
wherein the lead tab is folded such that the second section of the lead tab is directly placed onto an upper surface of a lower washer.

19. The electrolytic capacitor as claimed in claim 18,
wherein the first and second sections of the lead tab has respective cut-out lines to form respective flexible portions of the first and second sections of the lead tab, and
wherein the flexible portions of the first section of the lead tab are bent such that front parts of the flexible portions of the first section of the lead tab protrude out of the opening of the upper washer and are folded such that the front parts of the flexible portions of the first section of the lead tab are placed on a lower surface of the upper washer.

20. The electrolytic capacitor as claimed in claim 18, wherein flexible portions of the second section of the lead tab are bent such that front parts of the flexible portions of the second section of the lead tab protrude out of the opening of the upper washer and are folded such that the front parts of the flexible portions of the second section of the lead tab are placed between the first section of the lead tab and the first head of the rivet.

\* \* \* \* \*